(12) United States Patent
Engelhardt et al.

(10) Patent No.: US 6,801,359 B1
(45) Date of Patent: Oct. 5, 2004

(54) OPTICAL ARRANGEMENT PROVIDED FOR A SPECTRAL FANNING OUT OF A LIGHT BEAM

(75) Inventors: Johann Engelhardt, Bad Schönborn (DE); Heinrich Ulrich, Heidelberg (DE); Hilmar Gugel, Dossenheim (DE)

(73) Assignee: Leica Microsystems Heidelberg GmbH, Heidelberg (DE)

( * ) Notice: Subject to any disclaimer, the term of this patent is extended or adjusted under 35 U.S.C. 154(b) by 0 days.

(21) Appl. No.: 09/601,130
(22) PCT Filed: Jan. 28, 1999
(86) PCT No.: PCT/DE99/00211
  § 371 (c)(1),
  (2), (4) Date: Jul. 27, 2000
(87) PCT Pub. No.: WO99/39165
  PCT Pub. Date: Aug. 5, 1999

(30) Foreign Application Priority Data

Jan. 29, 1998 (DE) ............................................. 198 03 442

(51) Int. Cl.$^7$ ........................... G02B 5/04; G02B 21/00; G01J 3/04
(52) U.S. Cl. ................. 359/368; 359/615; 359/837; 250/201.3; 356/310
(58) Field of Search ................ 359/615, 831, 359/837, 368, 894; 250/201.3, 559.06, 559.16; 356/310

(56) References Cited

U.S. PATENT DOCUMENTS

| | | | |
|---|---|---|---|
| 5,532,873 A | | 7/1996 | Dixon .................. 359/388 |
| 5,537,247 A | | 7/1996 | Xiao ................... 359/368 |
| 5,600,620 A | | 2/1997 | Ohguri ................. 369/112 |
| 5,734,497 A | * | 3/1998 | Yano et al. |
| 5,866,911 A | * | 2/1999 | Baer |
| 5,946,100 A | * | 8/1999 | Ishihara |
| 5,973,316 A | * | 10/1999 | Ebbesen et al. |
| 6,028,306 A | * | 2/2000 | Hayashi |
| 6,130,750 A | * | 10/2000 | Ausschnitt et al. |

FOREIGN PATENT DOCUMENTS

EP     0 565 069 A1     10/1993

* cited by examiner

Primary Examiner—Ricky D. Shafer
(74) Attorney, Agent, or Firm—Simpson & Simpson, PLLC

(57) ABSTRACT

The invention relates to an optical arrangement provided for a spectral fanning out of a light beam (1), preferably the detection beam path of a confocal microscope, especially for the subsequent splitting of the fanned out beam (2) out of the dispersion plane thereof. The optical arrangment is also provided for detecting the fanned out spectral regions (4), whereby the incoming light beam (1) is focused on a pinhole (7). The invention is characterized in that the pinhole (7) has a polygonal passageway (8) in order to realize a high dynamic response when the light beam is split into spectral regions (4) or into spectral colors.

15 Claims, 5 Drawing Sheets

OPTICAL ARRANGEMENT PROVIDED FOR A SPECTRAL FANNING OUT OF A LIGHT BEAM

CROSS-REFERENCES TO RELATED APPLICATIONS

The present application is the U.S. national phase under 35 U.S.C. 371 of International Application PCT/DE99/00211 filed Jan. 28, 1999 claiming priority of German Patent Application No. 198 03 442.3 filed Jan. 29, 1998.

FIELD OF THE INVENTION

The invention concerns an optical arrangement for the spectral fanning out of a light beam, preferably in the detection beam path of a confocal microscope, especially for the subsequent splitting of the fanned out beam out of its dispersion plane and for the detection of the split up spectral ranges, whereby the incoming light beam is focused on a pinhole.

BACKGROUND OF THE INVENTION

Optical arrangements of the type in question here have been known from practice for a fairly long time, and specifically in connection with the simultaneous detection of several spectral ranges of a light beam, which is done with a stalled multi-band detector. A multi-band detector of this type makes for a complex optical arrangement that prior to this, with additional optics, has enabled multiple focusing.

If in the detection beam path of a confocal microscope one wants first to fan out the beam spectrally and then split it up out of its dispersion plane into individual spectral ranges, a high dynamic response for the separation of the excitation light is desired. However, diffractions that stem from the shape of the detection pinhole stand fundamentally in opposition to such a high dynamic, whereby in particular secondary maxima of the diffraction function in the spectrally separated detection range cause problems.

SUMMARY OF THE INVENTION

The object of the invention is therefore to configure and further develop an optical arrangement of the type in question such that a splitting of the fanned out beam with a suppression of interfering diffraction portions in the spectral range is possible.

The optical arrangement of the type in question according to the invention fulfills the aforementioned purpose by means of a pinhole having, a polygonal passageway for the light beam.

According to the invention, first of all it has been recognized that the form of the pinhole is responsible for the diffraction pattern that occurs for the various colors in the focus plane, or in the dispersion plane. While specifically a pinhole with a round passageway has annular secondary maximum diffraction values with limited dynamic response because of the diffraction effect occurring here, by using a pinhole with a polygonal passageway a completely different diffraction pattern results, namely a diffraction pattern whose secondary maximum diffraction values are arranged in lines that cross each other. In any case it is possible, in light of such an arrangement, to detect the primary diffraction maxima and to suppress the problematic secondary diffraction phenomena.

With regard to a concrete configuration of the pinhole or of the passageway formed there, it is of further benefit if this—polygonal—passageway is configured symmetrically.

In this case the passageway could be of triangular or four-cornered configuration, whereby in the context of a four-cornered configuration the symmetrical—and therefore rectangular—form is especially advantageous. From this there results specifically a completely specialized diffraction pattern of the pinhole for various spectral ranges or colors, namely a spectral cross, whereby the axes of the cross meet in the secondary diffraction maxima Secondary diffraction maxima lying in between are less problematic in the detection or splitting.

Diaphragms that are preferably variable could also be arranged in the beam path in front of or behind the pinhole. These diaphragms are used to suppress diffraction maxima or diffraction phenomena of a higher order.

In principle simultaneous detection of several spectral ranges of a light beam is possible without additional measures if the light beam is first spectrally fanned out and then a splitting of the fanned out beam out of the dispersion plane is performed. The splitting of the fanned out beam out of the dispersion plane is accomplished by means of a special optical arrangement, whereby the partial beams split up into spectral ranges or the spectral ranges themselves are detected, and indeed are detected simultaneously. The important thing here is that a fanning out of the light beam precedes the actual splitting into spectral ranges so that the splitting out of the dispersion plane can occur on the fanned out beam. In any case a multiple focusing with additional optics is not necessary here.

In principle two optically arrangements are provided here, namely once for the spectral fanning out of the light beam and another time for splitting and subsequent detection. The pinhole on which the incoming lightbeam is focused is situated upstream of the arrangement for spectral fanning out of the light beam, whereby the pinhole can be situated directly downstream of a laser scanner. What is important here, in any case, is the recognition that the form of the passageway in the pinhole creates a specific diffraction pattern of the fanned out light beam in the dispersion plane.

From the pinhole, the beam in some cases runs through the previously mentioned variable diaphragm to focusing optics and dispersion means. The dispersion means can be designed as a prism for an especially simple construction. Focusing optics, which can in turn comprise a lens arrangement, are arranged both in front of and behind the dispersion means or prism.

The beam running divergent from the path from the pinhole to the prism is focused through the focusing optics into the gap/detector arrangement situated downstream at which point the splitting into spectral ranges occurs.

Regarding the gap/detector arrangement, it is advantageous if special color selection gaps are provided there in the focusing plane or dispersion plane of the fanned out beam, said color selection gaps being in turn arranged and aligned such that diffraction can be screened out at the detection gap.

BRIEF DESCRIPTION OF THE DRAWINGS

There are then various possibilities for configuring and developing further the present invention in an advantageous way. On the one hand one can refer to the claims on the other hand, one can refer to the following explanation of an embodiment of the invention with reference to the drawings. Generally preferred configurations and further developments of the concept are explained in connection with the explanation of the preferred embodiment of the invention. The drawings show:

DETAILED DESCRIPTION OF THE DRAWINGS

Figure 1:
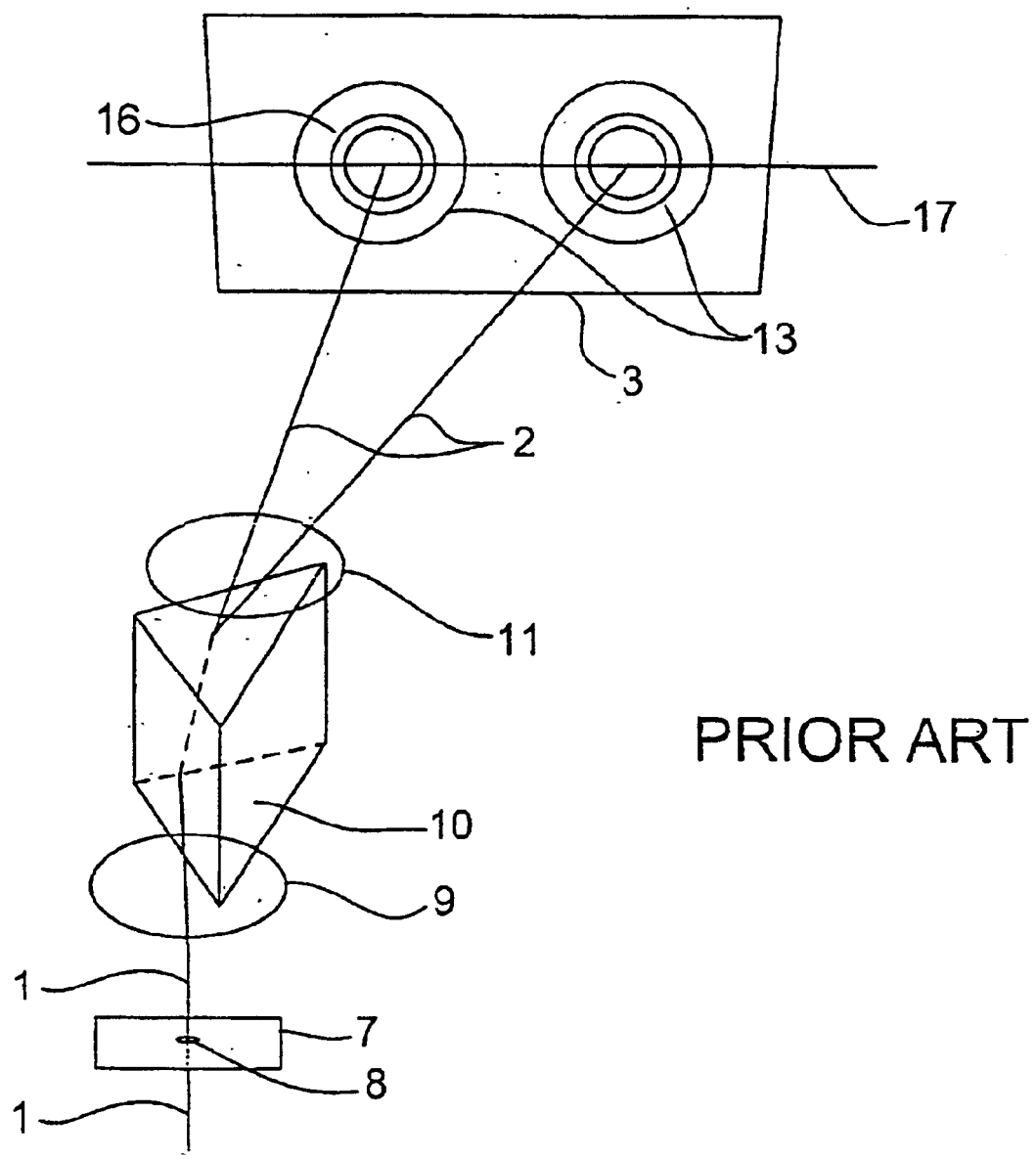
FIG. 1 in a schematic representation, a traditional optical arrangement with a pinhole having a round passageway, FIG. 2 in a schematic representation, an embodiment of an optical arrangement according to the invention, whereby the pinhole has a square passageway and, FIG. 3 in a schematic representation, the entire optical arrangement comprising the fanning out of the light beam, the splitting of the fanned out beam and the detection, FIG. 4 in a schematic representation, a first embodiment of an optical arrangement according to the invention, whereby the pinhole has a square passageway and the pinhole receives light from a confocal microscope; and, FIG. 5 in a schematic representation, a second embodiment of an optical arrangement according to the invention, whereby the pinhole has a square passageway and the pinhole receives light from a confocal microscope.
Figure 2:
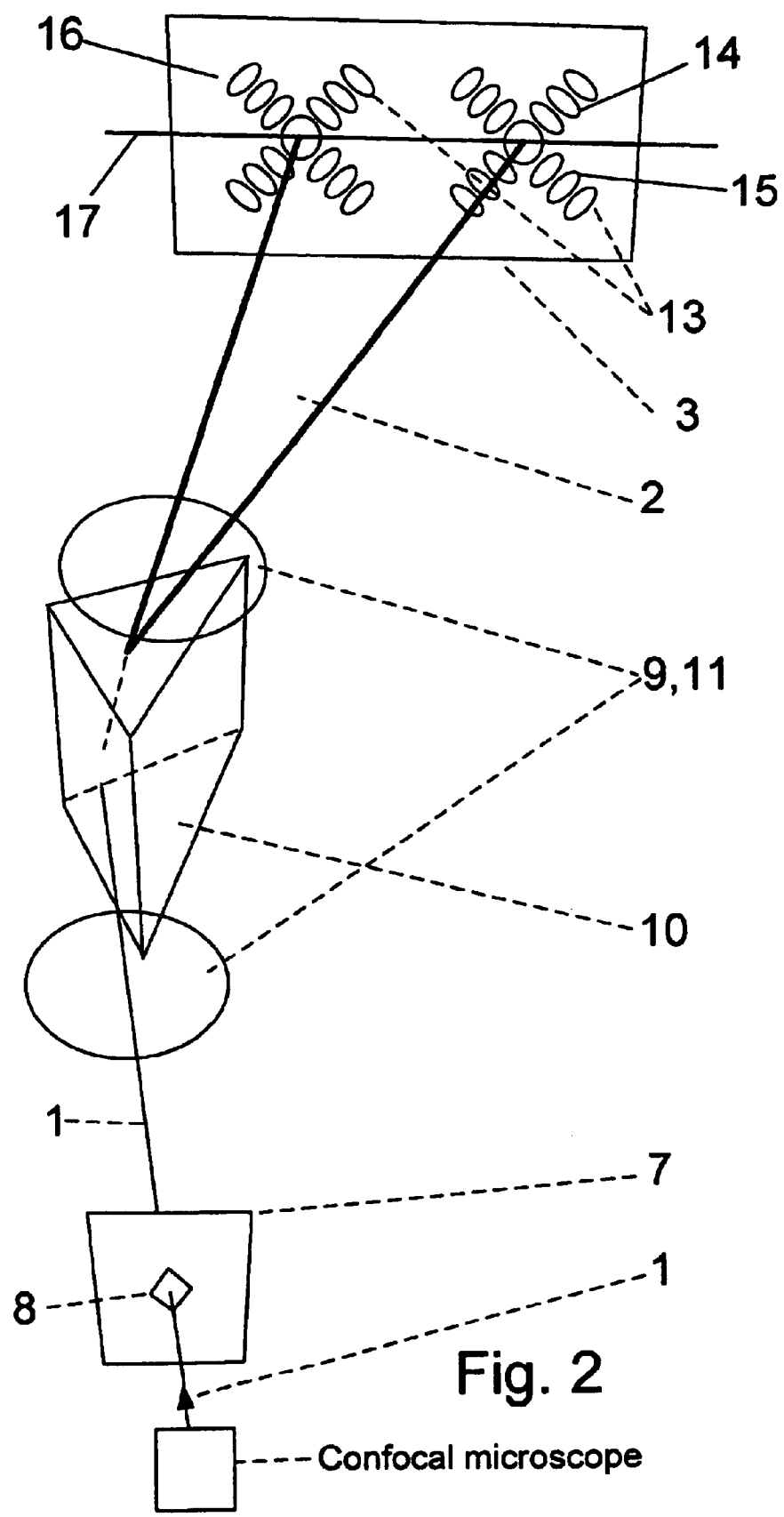
Figure 3:
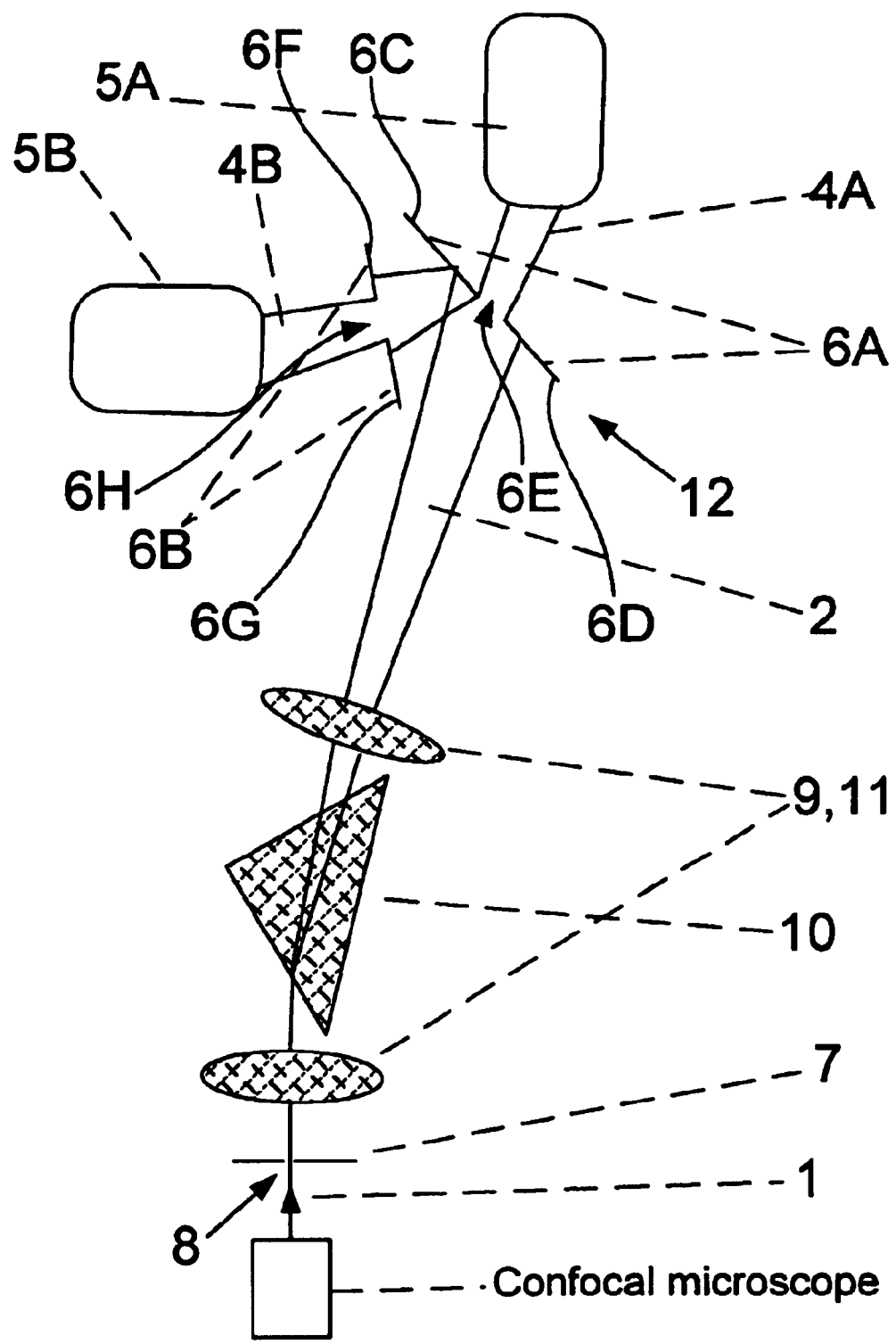

FIGS. 1 through 3 show an optical arrangement for the spectral fanning out of a light beam 1, the light beam 1 here being in the detection beam path of a confocal microscope (not shown). After the spectral fanning out of the light beam 1, there is a splitting of the fanned out beam 2 from out of its dispersion plane 3. A detection of the split spectral ranges 4 is accomplished by means of suitable detectors 5. The overall connection can be inferred from FIG. 3, whereby detection gaps 6 are provided there for selection of the spectral ranges 4. The simple representation used here serves to clarify the operation. Additional details are left out in order to give an overview.

The optical arrangement shown in FIG. 1 is an arrangement of the conventional type, i.e. an arrangement known in the art, in which the incoming light beam 1 is focused on a pinhole 7 with a round passageway 8. From there out the beam runs through focusing optics 9 and a dispersion means configured as a prism 10 and through additional focusing optics 11 into a gap/detector arrangement 12 indicated only in FIG. 3, whereby due to a pinhole 7 with a round passageway 8 in the dispersion plane 3 a completely specialized diffraction pattern 13 for different colors is produced. Annularly depicted secondary diffraction maxima limit the dynamic response of the known system.

FIG. 2 shows an optical arrangement according to the invention in which the pinhole 7 has a polygonal passageway 8, specifically a four-cornered or rectangular passageway. This pinhole 7 or the passageway 8 realized there, in contrast to the traditional optical arrangement, creates a completely different diffraction pattern 13 in the dispersion plane 3, specifically because of the diffraction maxima 16 arranged in two lines 14 and 15.

FIG. 2 shows in merely symbolic fashion that the detection gaps 6 are arranged and aligned such that the diffraction phenomena at the detection gap 6 can be screened, since at most negligible secondary maximum diffraction values lie along the detection line 17.

However, what is important is that the configuration of the pinhole, or its passageway 8, is responsible for the diffraction pattern 13, whereby with a polygonal passageway 8, the pinhole 7 yields a diffraction pattern 13 that enables a screening of the secondary maxima of the diffraction phenomena by means of suitable detection gaps 6, thus specifically with the use of a rectangular opening 8 of the pinhole 7 by means of spectral splitting diagonal to the diffraction cross.

Figure 4:
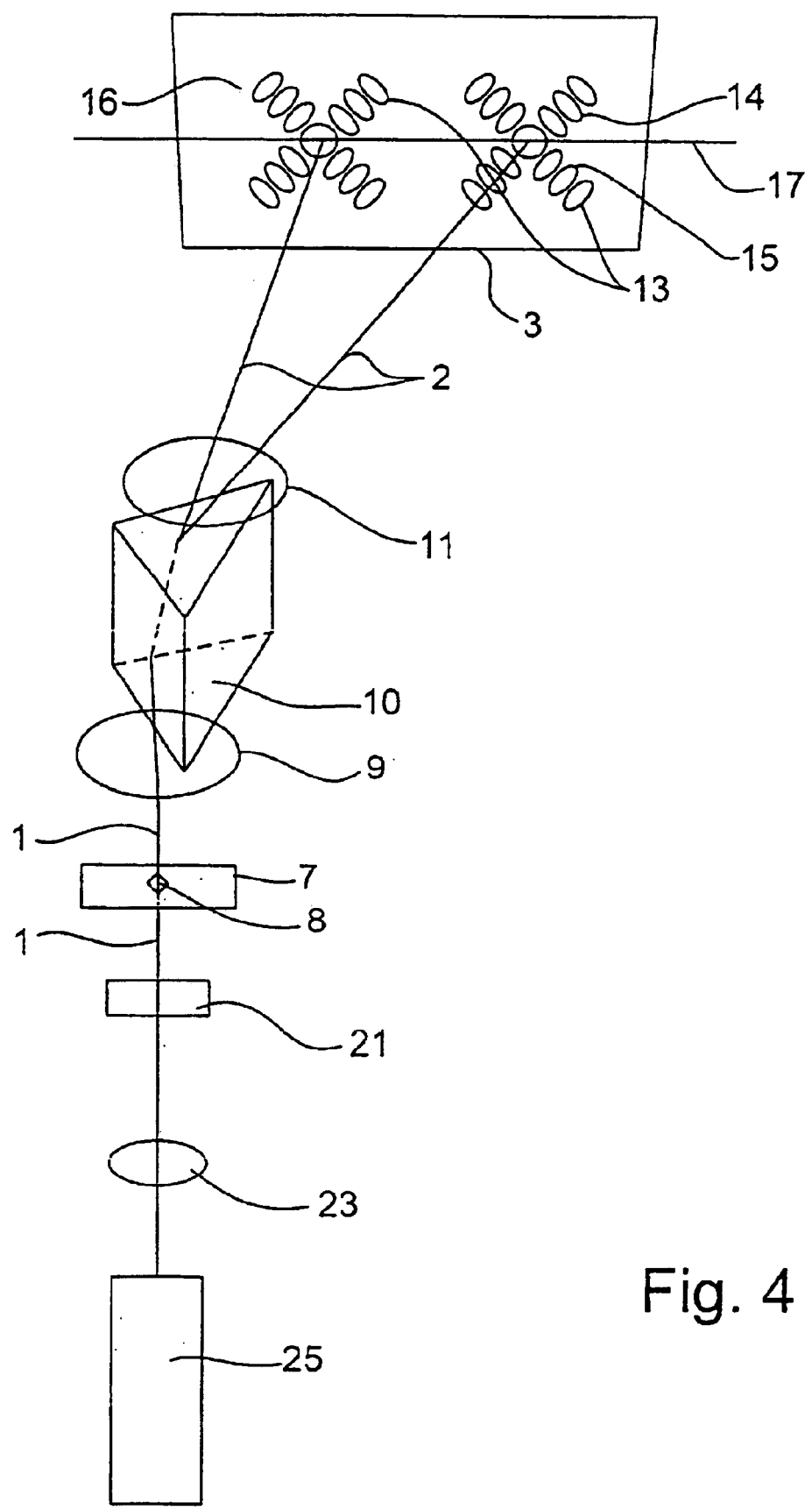

FIG. 4 illustrates a first embodiment of an optical arrangement according to the invention, whereby the pinhole receives light from a confocal microscope. Light source 25 emits light beam 1, which traverses lens 23 and sample 21. Light transmitted through and emitted from the sample is incident on pinhole 7.

Figure 5:
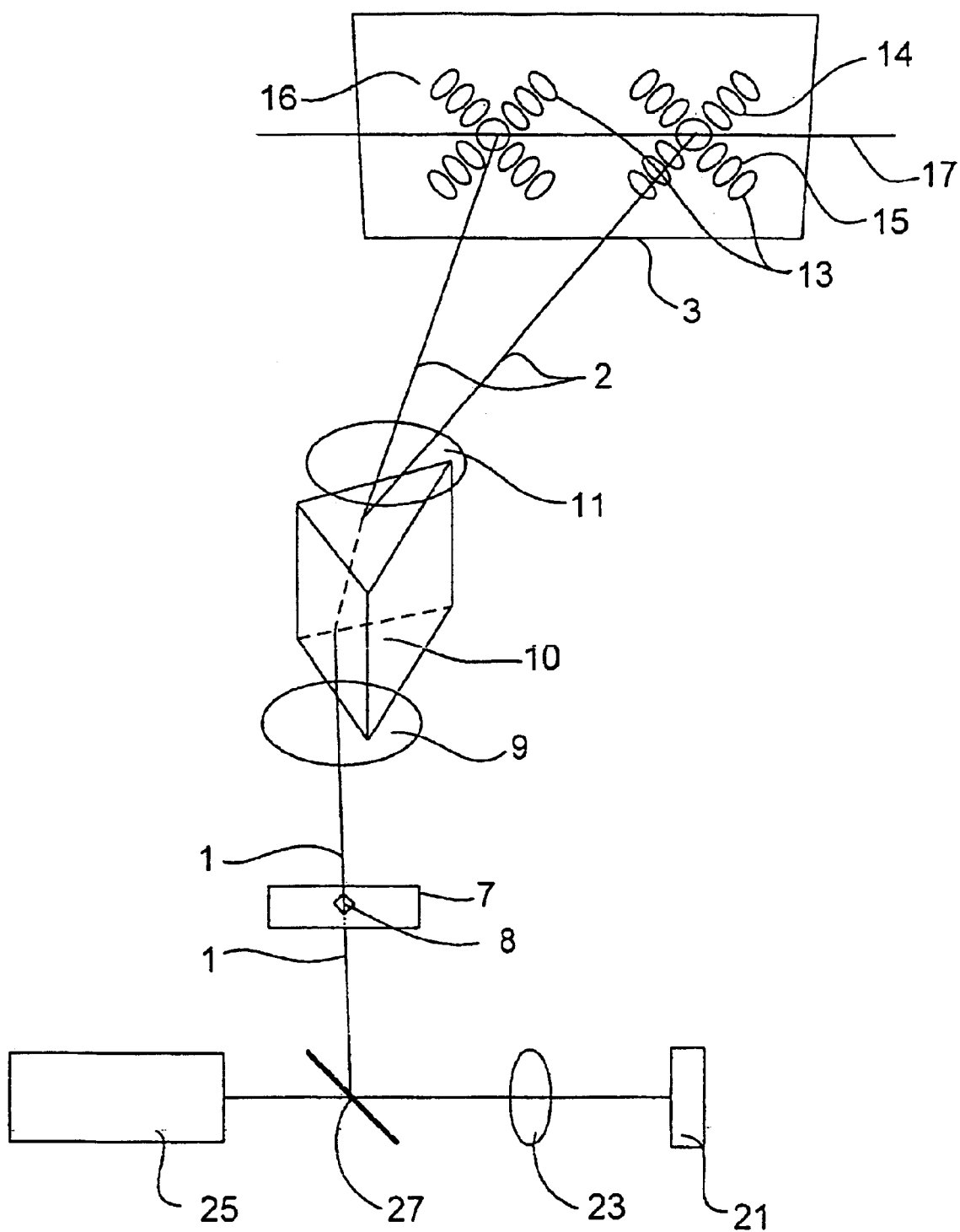

FIG. 5 illustrates a second embodiment of an optical arrangement according to the invention, whereby the pinhole receives light from a confocal microscope. Light source 25 emits light beam 1, which passes through beam splitter 27, traverses lens 23, and is incident on sample 21. Light reflected by and emitted from the sample is reflected by beam splitter 27 and is incident on pinhole 7.

FIG. 3 shows the splitting of fanned out beam 2 by gap/detector arrangement 12. Detection gaps 6A and 6B each include a plurality of locations at which fanned out beam 2 strikes, for example, locations 6C, 6D, and 6E in detection gap 6A and locations 6F, 6G, and 6H in detection gap 6B. Locations 6C and 6D, and 6F and 6G, on gap detectors 6A and 6B, respectively, are reflective surfaces. That is, those portions of fanned out beam 2 striking these surfaces are reflected, as shown in FIG. 3. Locations 6E and 6H are gaps in gap detectors 6A and 6B, respectively, and pass those portions of fanned out beam 2 striking locations 6E and 6H, as shown in FIG. 3.

Thus, detection gap 6A passes spectral range 4A, a first range of fanned out beam 2, striking gap 6E. Detector 5A detects at least a portion of spectral range 4A. Detection gap 6A also reflects, to detector gap 6B, that portion of fanned out beam 2 striking reflective locations 6C and 6D. Spectral range 4B, a second range of fanned out beam 2, is formed by the portion of fanned out beam 2 reflected by detection gap 6A and striking gap 6H in detection gap 6B. Thus, detection gap 6B passes spectral range 4B. Detector 5B detects at least a portion of spectral range 4B.

5B detector
6A detection gap
6B detection gap
6C detection gap reflective location
6D detection gap reflective location
6E detection gap, gap location
6F detection gap reflective location
6G detection gap reflective location
6H detection gap, gap location

REFERENCE NUMBER LIST 1 light beam
2 fanned out beam
3 dispersion plane
4A spectral range
4B spectral range
5A detector gap
6 detection gap
7 pinhole
8 passageway
9 focusing optics
10 prism
11 focusing optics
12 gap/detector arrangement
13 diffraction pattern
14 line
15 line
16 diffraction maxima
17 detection line

What is claimed is:

1. An optical arrangement in a confocal microscope, the arrangement comprising:

means for spectrally fanning out an incoming light beam in a detection beam path of said confocal microscope;

means for splitting said spectrally fanned out light beam out of a dispersion plane for said spectrally fanned out light beam;

means for detecting a spectral range of said split, spectrally fanned out light beam; and, a pinhole occluder, located at a focus for said detection beam path, having a passageway with a polygonal configuration.

2. The optical arrangement as recited in claim 1 wherein said means for spectrally fanning out an incoming light beam further comprises a prism.

3. The optical arrangement as recited in claim 1 wherein said means for splitting said spectrally fanned out light beam further comprises a plurality of locations at which said spectrally fanned out light beam strikes said splitting means; and, wherein said means for splitting said spectrally fanned out light beam reflects all of said spectrally fanned out light beam at a first location selected from said plurality of locations and passes all of said spectrally fanned out light beam at a second location selected from said plurality of locations.

4. The optical arrangement as recited in claim 3, wherein said means for splitting said spectrally fanned out light beam further comprises a first detection gap element having a first gap; and, wherein said first gap is operatively arranged to pass a first range of said spectrally fanned out light.

5. The optical arrangement as recited in claim 4 wherein said means for detecting a spectral range of said split, spectrally fanned out light beam further comprises a first detector operatively arranged to detect at least a portion of said first range passing through said first gap.

6. The optical arrangement as recited in claim 4 wherein said first detection gap element further comprises a reflective surface operatively arranged to reflect a second range of said spectrally fanned out light beam; and, wherein said means for splitting said spectrally fanned out light beam further comprises a second detection gap element having a second gap operatively arranged to pass said reflected second range.

7. The optical arrangement as recited in claim 6 wherein said means for detecting a spectral range of said split, spectrally fanned out light beam further comprises a second detector operatively arranged to detect at least a portion of said second range passing through said second gap.

8. The optical arrangement as recited in claim 1 wherein said passageway is symmetrically configured.

9. The optical arrangement as recited in claim 8 wherein said passageway has a triangular configuration.

10. The optical arrangement as recited in claim 8 wherein said passageway has a four-corner configuration.

11. The optical arrangement as recited in claim 8 wherein said passageway has a rectangular configuration.

12. The optical arrangement as recited in claim 1 wherein said passageway has a triangular configuration.

13. The optical arrangement as recited in claim 1 wherein said passageway has a four-corner configuration.

14. The optical arrangement as recited in claim 1 wherein said passageway has a rectangular configuration.

15. An optical arrangement in a confocal microscope, the arrangement comprising:

means for spectrally fanning out an incoming light beam in a detection beam path of said confocal microscope;

means for splitting said spectrally fanned out light beam out of a dispersion plane for said spectrally fanned out light beam;

at least one detector operatively arranged to detect a range of said spectrally fanned out beam on a detection line in said dispersion plane, said detection line defined by diffraction minima of said fanned out beam on said dispersion plane; and, a pinhole occluder, located at a focus for said detection beam path, having a passageway with a polygonal configuration.

* * * * *